March 26, 1957     A. W. GAUBATZ     2,786,667
CONTROL APPARATUS

Filed May 1, 1953     3 Sheets-Sheet 1

INVENTOR
Arthur W. Gaubatz
BY
Paul Fitzpatrick
ATTORNEY

March 26, 1957   A. W. GAUBATZ   2,786,667
CONTROL APPARATUS

Filed May 1, 1953.   3 Sheets-Sheet 2

INVENTOR
Arthur W. Gaubatz
BY
Paul Fitzpatrick
ATTORNEY

March 26, 1957  A. W. GAUBATZ  2,786,667
CONTROL APPARATUS

Filed May 1, 1953  3 Sheets-Sheet 3

INVENTOR
Arthur W. Gaubatz
BY Paul Fitzpatrick
ATTORNEY

United States Patent Office 2,786,667
Patented Mar. 26, 1957

2,786,667
CONTROL APPARATUS

Arthur W. Gaubatz, Indianapolis, Ind., assignor to General Motors Corporation, Detroit, Mich., a corporation of Delaware Application May 1, 1953, Serial No. 352,453

11 Claims. (Cl. 264—3)

This invention relates to control apparatus, and more particularly to a centrifugal governor wherein a plurality of electrical switches or other control elements are actuated sequentially at predetermined speeds of rotation of an engine or other rotating agency.

The invention employs a construction wherein centrifugally actuated flyweights are revolved by a rotating shaft to transmit an axial thrust to adjust the position of an axially movable non-rotatable sleeve member. The sleeve member is provided with a cam surface for sequential engagement with a plurality of axially staggered microswitches or equivalent control elements and is also provided with a step surface for sequential engagement with a plurality of concentric non-rotating balance springs which individually determine the cut-in points of the microswitches.

The invention features an adjusting means for one or more of the balance springs that takes the form of one or more spur gears threaded for movement in the governor housing and a pinion adapted for driving engagement with one or more of the spur gears to adjust the pre-loading of one or more of the balance springs.

An object of the invention is to provide a construction wherein a plurality of control elements are sequentially operated.

Another object of the invention is to provide each control element with a simple means for adjusting its cut-in point.

Further objects and advantages of the present invention will be apparent from the following description, reference being had to the accompanying drawings wherein a preferred form of the present invention is clearly shown.

Figure 1:
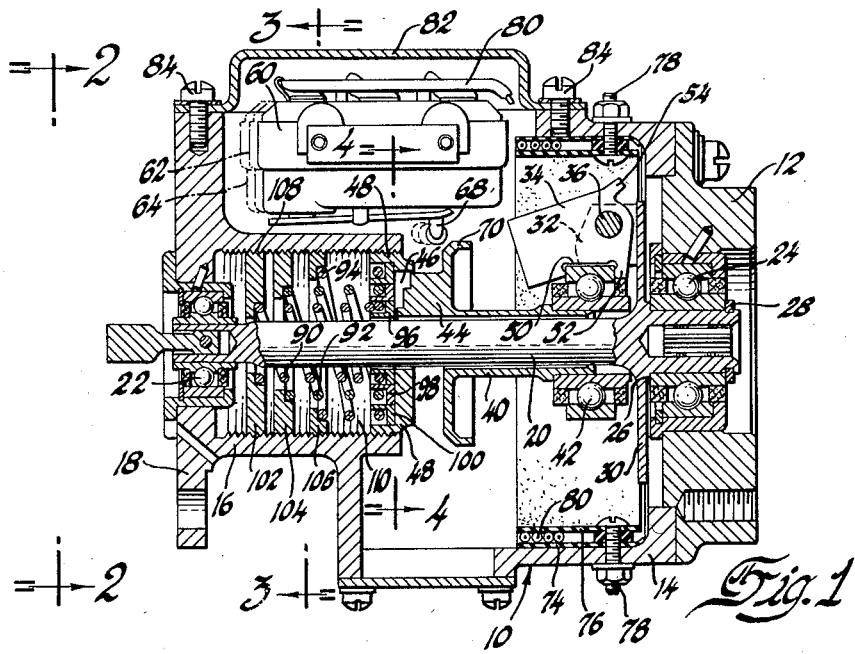
Fig. 1 is a section of a control apparatus in accordance with the present invention taken substantially along the planes indicated by the line 1—1 of Fig. 2.
Figure 2:
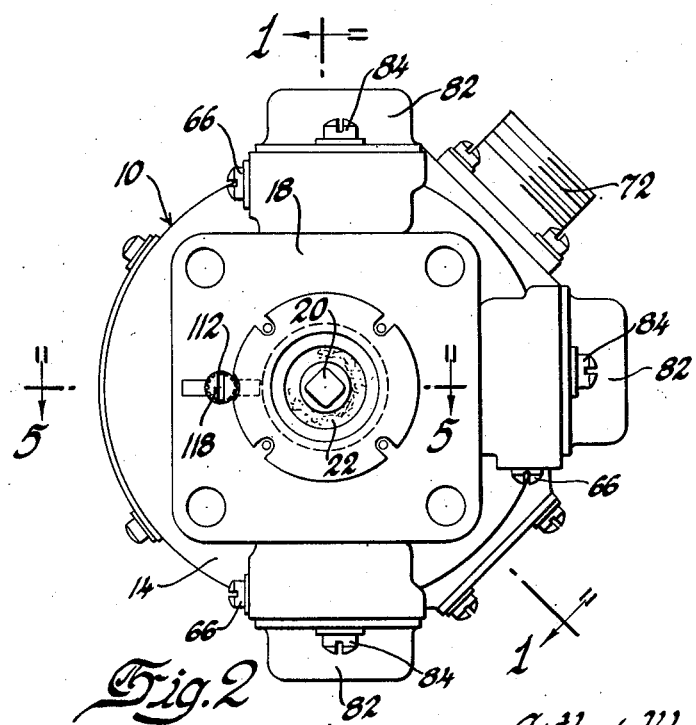
Fig. 2 is an elevation taken from the plane indicated by the line 2—2 of Fig. 1.
Figure 3:
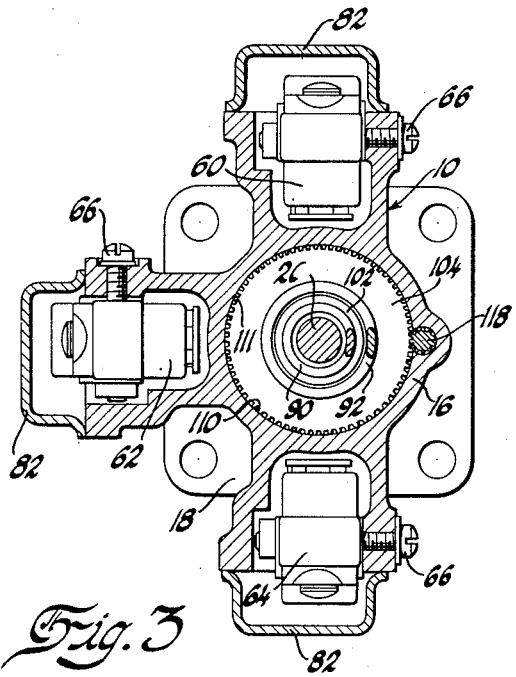
Fig. 3 is a section taken substantially on the plane indicated by the line 3—3 of Fig. 1.
Figure 4:
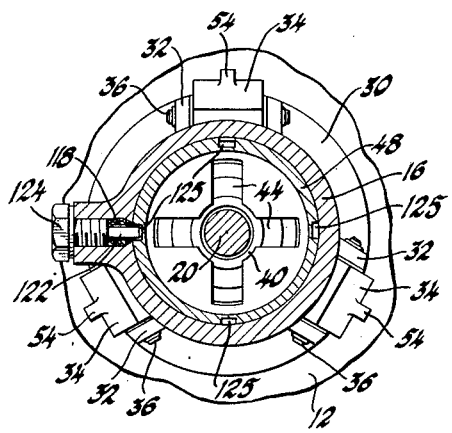
Fig. 4 is a partial section taken substantially on the plane indicated by the line 4—4 of Fig. 1.

Referring now to the drawings, the governor assembly includes a housing 10 and a centrally apertured end cover 12 detachably secured thereto. The housing 10 has several substantially circular sections along its length including an enlarged portion 14 and a reduced portion 16 having a centrally apertured flange 18 by which the housing is mounted on an engine or other rotation imparting device. The governor shaft 20 may be driven from either of its ends and is supported for rotation in the housing by ball bearings 22 and 24.

The shaft 20 is secured against axial shifting by the cooperation of a shoulder 26 and a C-ring 28 with the inner race of the bearing 24. An annular flange 30 on the shaft carries three clevis-like mounting brackets 32 each formed by a pair of adjacent arms. Each bracket 32 carries a pivotable flyweight 34 on a transverse pin 36.

An axially shiftable sleeve 40 is coaxially spaced with the governor shaft 20 and slidably supported therefrom at one end by the ball bearing 42. The sleeve 40 is slidably supported against rotation at the other end by four radially projecting lugs 44 slidably received in four radial slots 46 in a balance spring retainer ring 48 that is threaded in the threaded bore of the reduced portion 16 of the housing. The outer race of the bearing 42 is slidably supported by the flyweight mounting brackets 32 which form a fingered pocket that conforms to the surface of the outer race of the bearing 42. The inner edge of each of the flyweights 34 is notched or grooved at 50 to fit loosely over the outer race of the bearing 42 and an inwardly projecting tang 52 forming one side of the notch bears against the adjacent side of the outer race to exert an axial thrust on the sleeve 40 as the flyweights swing outwardly under the influence of centrifugal force. The notch 50 provides a surface which limits the inward motion of the flyweights and their outward motion is limited by the engagement of a tang 54 with the disk-like flange 30 of the governor shaft.

A plurality of control elements such as the conventional microswitches 60, 62 and 64 are secured in the housing 10 by suitable means as by the screws 66. The switches are relatively displaced axially of the sleeve 40 as may be seen by their dotted out-of-position outlines in Fig. 1. The switch actuating arms 68 of the switches are actuated in succession by the axial movement of the disk-like flange 70 of the sleeve 40. The microswitches may be arranged to complete separate electrical control circuits on engagement or disengagement of the disk-like flange 70, as desired. In the illustrated embodiment of the invention, each of the microswitches is a single-pole double-throw type which completes a separate electrical circuit when its actuating arm is displaced radially outward by engagement with the flange 70.

The external wiring connections to the switches are brought in through a conventional plug connector 72 detachably mounted on the housing 10. A pair of spaced concentric cylindrical insulators 74 and 76 are secured in the housing by bolts 78 and form an annular distribution chamber for the internal wiring harness 80 of the switches. Cover plates 82 detachably secured to the housing 10 by bolts 84 provide access to the microswitches.

The microswitches 60, 62 and 64 are, respectively, low speed, intermediate speed and high speed switches adapted to be actuated at speeds set by the individual adjustment of their respective balance springs; for example, at shaft speeds of 2,000, 3,000 and 4,000 R. P. M. Axial movement of the sleeve 40 by the flyweights 34 is yieldably opposed in successive increments by a low speed balance spring 90, an intermediate speed balance spring 92, and a high speed balance spring 94. The balance springs are concentrically arranged around the governor shaft 20 and are supported at one end by a plurality of concentric end rings 96, 98 and 100 which are slidably supported within each other and within the retainer ring 48. The balance springs are supported at the other end by the axially spaced adjusting collars 102, 104 and 106. The adjusting collars are individually shiftable axially as will be seen, and the balance springs adjustably pre-loaded thereby, that is, maintained in desired initial compression between the adjusting collars and the end rings which bear against the slotted face of the retainer ring 48. The radial lugs 44 of the sleeve 40 are stepped to engage sequentially the end rings 96, 98 and 100 of the balance springs 90, 92 and 94 on increasing speed of the governor shaft. As the sleeve 40 shifts to the left with increasing R. P. M., it will simultaneously engage the end ring 96 of the low speed balance spring 90 and the actuating arm of the low speed microswitch 60. The sleeve 40 will then remain stationary until the R. P. M. increases to an extent sufficient to overcome the pre-loading of the low speed balance spring 90 whereon the sleeve 40 will shift to engage simultaneously the end ring 98 of the intermediate speed balance spring 92 and the operating arm of the intermediate speed microswitch 62 as it actuates the low speed microswitch 60. With increasing R. P. M. the sleeve 40 will likewise successively actuate the intermediate and high speed microswitches 62 and 64 as the pre-loading of their balance springs 92 and 94 is overcome.

Figure 5:
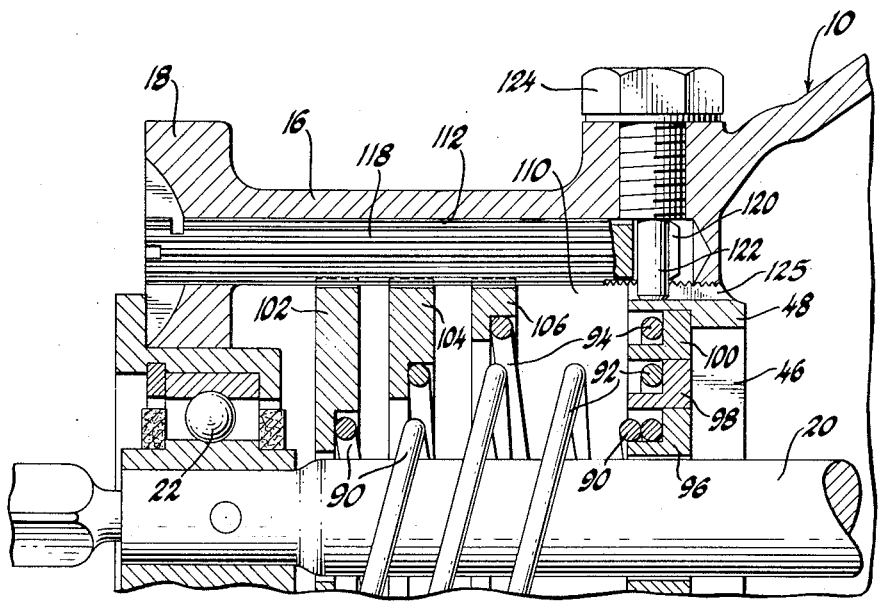
Fig. 5 is an enlarged partial section taken substantially on the plane indicated by the line 5—5 of Fig. 2.
Figure 6:
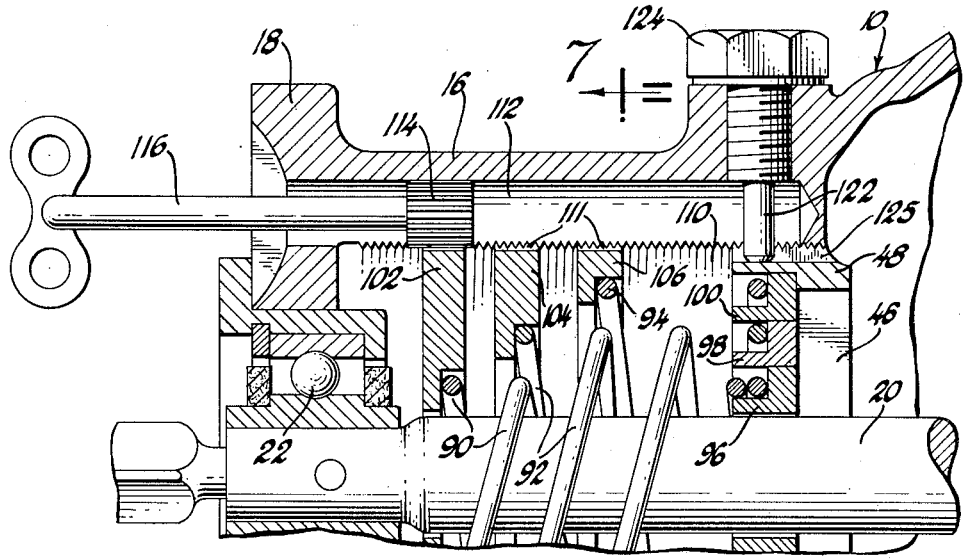
Fig. 6 is a partial section corresponding to Fig. 5 with an adjusting key 116 replacing a locking element 118.
Figure 7:
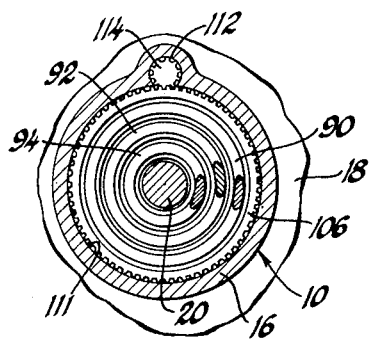
Fig. 7 is a reduced section taken substantially along the plane indicated by the line 7—7 of Fig. 6.
Figure 8:
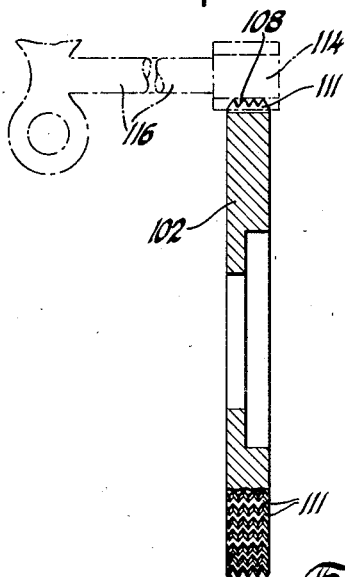
Fig. 8 is an enlarged elevation, partially broken away, of an adjusting collar of the invention.

A primary feature of the present invention is the novel arrangement for individually adjusting the pre-loading of the balance springs so that the governor may be easily adapted for various installations. Other inventive features disclosed in this application such as the sequential pickup of the pre-loaded balance springs are disclosed and claimed in my copending application S. N. 326,568, Centrifugal Governor, filed December 17, 1952. Each of the adjusting collars 102, 104 and 106 is provided with external threads 108 so that it may be screwed into the threaded bore 110 of the body portion 16 of the housing. Each of the adjusting collars is also provided with external gear teeth 111 which are cut across the threads 108 as best seen in Figure 8. Independent pre-loading of the balance springs is accomplished by independent adjustment of the axial position of their adjusting collars as best seen in Fig. 6. The end portion 16 of the housing is provided with a small non-threaded bore 112 that is parallel to the threaded bore 110 and in side communication therewith. The small bore 112 is adapted for the reception of the pinion end 114 of an adjusting key 116. The adjusting key 116 may be manually inserted in the bore 112 and its pinion end 114 selectively engaged with the spur gear surfaces of the adjusting collars 102, 104 and 106 to impart rotation thereto and consequently axial movement resulting from their threaded engagement with the threaded bore 110. After the cut-in points of the microswitches are set as desired, the adjusting key 116 is removed from the bore 112 and the adjusting collars are locked in position by inserting a locking pinion 118 in the small bore 112 as best seen in Fig. 5. The locking pinion 118 may be sufficiently tight in the bore 112 to prevent its accidental removal axially and is keyed against rotation by the engagement of its slotted end 120 with the pin 122 of the stop bolt 124. The pinion 118 is fully secured against axial removal when the mounting flange 18 is secured to a corresponding flange on the engine. The retainer ring 48 is threaded in the threaded bore 110 and is also secured against rotation by the reception of the pin 122 in peripheral slots 125 cut across its threads.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

I claim:

1. A control device comprising a housing, mechanism associated therewith for movement relative thereto, an abutment having a surface threaded to said housing and adapted for movement relative thereto, resilient means operatively engaging said abutment and mechanism for resisting the movement of said mechanism, and gear teeth on the threaded surface of said abutment for imparting movement thereto to increase and decrease the resistance of said resilient means.

2. A speed responsive device comprising a housing, a shaft supported thereon for rotation relative thereto, mechanism actuated by said shaft for movement relative to said shaft and housing in accordance with the speed of said shaft, an abutment having a surface threaded to said housing and adapted for movement relative to said housing and mechanism, resilient means operatively engaging said abutment and mechanism for resisting the movement of said mechanism, and gear teeth in the threaded surface of said abutment and a pinion cooperating therewith for imparting movement to the abutment to increase and decrease the resistance of said resilient means.

3. A speed responsive device comprising a housing, a shaft supported therein for rotation relative thereto, mechanism actuated by said shaft for axial movement relative to said shaft and housing in accordance with the speed of said shaft, an abutment having a surface threaded in said housing and adapted for rotation and axial movement relative to said housing and mechanism, and resilient means operatively engaging said abutment and mechanism for resisting the axial movement of said mechanism, the threaded surface of said abutment having gear teeth formed thereon for imparting rotation thereto to increase and decrease the resistance of said resilient means.

4. A speed responsive device comprising a housing, a shaft supported therein for rotation relative thereto, mechanism actuated by said shaft for axial movement relative to said shaft and housing in accordance with the speed of said shaft, a threaded bore in said housing, an abutment threaded in said bore and adapted for rotation and axial movement therein relative to said housing and mechanism, resilient means operatively engaging said abutment and said mechanism for resisting the axial movement of said mechanism, the threaded surface of said abutment having gear teeth formed therein for imparting rotation thereto to increase and decrease the resistance of said resilient means, and a passage in said housing communicating with said threaded bore offering access to said gear teeth for driving the same.

5. A centrifugal governor comprising a housing, a shaft rotatable therein, flyweights on said shaft, a sleeve coaxial with said shaft and axially movable thereof by said flyweights in accordance with the speed of said shaft, a threaded bore in said housing coaxial with said shaft, a plurality of abutment disks threaded in said bore for travel therein, a plurality of concentric coil springs in said bore each having one end in engagement with a respective abutment disk and operatively associated at the other end with said sleeve for sequentially opposing axial movement thereof by said flyweights, a plurality of electrical control means axially displaced alongside said sleeve and responsive to the sequential axial movement thereof for sequential actuation thereby, and gear teeth formed on the threaded surfaces of said abutment disks for imparting rotation thereto to increase and decrease the resistance of said coil springs and consequently the actuation points of said electrical control means, said housing having a non-threaded bore in side communication with said threaded bore offering access to said gear teeth for driving the same.

6. A centrifugal governor comprising a rotating shaft, flyweights revolved by said shaft, an operating member shiftable by said flyweights in accordance with the speed of said shaft, a plurality of control means engageable by said operating member on shifting thereof for sequential actuation thereby, a plurality of resilient means operatively associated with said operating member to sequentially resist the shifting thereof, the compression in each of said resilient means serving to set the actuation point of a respective one of said control means, means for adjusting the compression of each of said resilient means without disturbing the adjustment of the remaining resilient means, and a common locking device for said adjusting means.

7. A housing having a threaded bore therein, an abutment threaded in said bore for rotation and axial movement relative said housing, the threaded surface of said abutment having gear teeth formed therein for imparting rotation thereto, and a passage in said housing communicating with said threaded bore offering access to said gear teeth for driving the same.

8. A control device comprising a housing, an abutment having a surface threaded to said housing for movement relative thereto, and gear teeth formed across the threaded surface of said abutment for imparting rotation thereto.

9. A control device comprising a housing, mechanism associated therewith for movement relative thereto, an abutment having a surface threaded to said housing and adapted for movement relative thereto, resilient means operatively engaging said abutment and mechanism for resisting the movement of said mechanism, gear teeth being formed in the threaded surface of said abutment, and a gear mounted on said housing cooperating with said teeth for imparting movement to said abutment to increase and decrease the resistance of said resilient means.

10. A mechanism comprising a frame including a threaded part, a threaded abutment threaded onto the said part of the frame so that rotation of the abutment relative to the part moves the abutment axially of the part, the threaded surface of said abutment having gear teeth thereon transverse to the threads thereon for imparting rotation thereto, the frame defining a passage generally parallel to the axis of said threaded part providing access to the gear teeth of said abutment, and a pinion mounted in said passage engaging said gear teeth to control the position of the abutment.

11. A mechanism comprising a frame including a threaded part, a plurality of threaded abutments threaded onto the said part of the frame so that rotation of each abutment relative to the part moves the abutment axially of the part, the threaded surfaces of said abutments having gear teeth thereon transverse to the threads thereon for imparting rotation thereto, the frame defining a passage generally parallel to the axis of said threaded part providing access to the gear teeth of said abutments, and a pinion mounted in said passage engaging the gear teeth of said abutments to control the position of the abutments.

References Cited in the file of this patent
UNITED STATES PATENTS

| Number | Name | Date |
|---|---|---|
| 650,848 | Littlefield | June 5, 1900 |
| 1,132,068 | Brugger | Mar. 16, 1915 |
| 1,671,756 | Wilshusen | May 29, 1928 |
| 1,964,251 | Cowles et al. | June 26, 1934 |
| 2,256,715 | Kirschner | Sept. 23, 1941 |
| 2,631,025 | Bone | Mar. 10, 1953 |
| 2,644,682 | Fricke et al. | July 7, 1953 |